United States Patent [19]  
Das

[11] 4,064,087  
[45] Dec. 20, 1977

[54] METHOD FOR PREPARING POLYMERS IN AQUEOUS MEDIUM

[75] Inventor: Suryya K. Das, Pittsburgh, Pa.

[73] Assignee: PPG Industries, Inc., Pittsburgh, Pa.

[21] Appl. No.: 646,722

[22] Filed: Jan. 5, 1976

[51] Int. Cl.$^2$ ............................................. C08L 33/08
[52] U.S. Cl. ................... 260/29.6 RB; 260/29.6 RW; 260/29.6 WB; 260/29.6 Z; 260/29.7 W; 260/29.7 UA; 260/29.7 UP; 260/875; 260/879; 260/885; 260/881; 260/883
[58] Field of Search ............. 260/29.6 RB, 29.6 RW, 260/29.6 WB, 29.7 W, 29.6 Z, 29.7 UA, 29.7 UP

[56] References Cited

U.S. PATENT DOCUMENTS

| 2,859,201 | 11/1958 | Uraneck et al. | 260/29.7 UP |
| 3,810,859 | 5/1974 | Mikofaloy | 260/29.6 RW |

*Primary Examiner*—M. J. Welsh
*Attorney, Agent, or Firm*—Carl T. Severini; Frank J. Troy

[57] ABSTRACT

A novel method of preparing polymers in aqueous medium involves the free radical initiated addition polymerization of the monomer or monomers from which the polymer is formed in an aqueous medium in the presence of a non-salt forming free radical polymerization initiator and a salt or partial salt of an acid-containing polymer containing one or more pendent double bonds. The pendent double bonds of the acid containing polymer provide a convenient grafting site for the polymer being formed by the free radical polymerization.

The novel method of the invention provides for excellent stability and compatibility of the resultant aqueous based polymer.

14 Claims, No Drawings

METHOD FOR PREPARING POLYMERS IN AQUEOUS MEDIUM

BACKGROUND OF THE INVENTION

The present invention relates to a method of preparing polymers in an aqueous medium. More particularly the invention relates to the preparation of polymers in aqueous medium by the free radical addition polymerization of monomers in an aqueous medium in the presence of a non-salt forming free radical polymerization initiator and a salt or partial salt of an acid-containing polymer having one or more pendent double bonds.

U.S. Pat. No. 3,258,437 discloses the preparation of polymers of butadiene in aqueous medium by a method which involves addition polymerizing diene or diene plus an ethylenically unsaturated monomer in water in the presence of a water-soluble free radical polymerization initiator and an amine or ammonia solubilized salt of an adduct of a drying oil of a long oil alkyd and a dicarboxylic acid or anhydride. This method while advantageous in many ways nevertheless has some limitations. For example, the stability of the oil adduct salt and hence the overall stability of the resultant polymer emulsion is not as good as one would desire. Moreover, the process is not readily adaptable to the preparation of other aqueous polymer emulsions. Finally, the products produced by the process while excellent for many coating applications and methods are not suitable in certain coating applications such as electro deposition due to the presence of the water-soluble polymerization catalyst employed.

It is also known to prepare an amide-containing acrylic interpolymer in aqueous medium by a process involving the free radical addition polymerization of the monomers in aqueous medium in the presence of an oil-soluble free radical polymerization initiator and an amine salt of an acrylic interpolymer of an unsaturated carboxylic acid amide, an unsaturated carboxylic acid and other ethylenically unsaturated monomers. This method is advantageous in that it produces polymers having excellent properties. However, this method also has its disadvantages. Thus, with certain polymers the method does not always produce polymer emulsions having the desired degree of stability and compatibility.

SUMMARY OF THE INVENTION

The present invention provides a method of preparing various polymers in aqueous medium by a process involving the addition polymerization of the monomer or monomers from which the polymer is formed in the presence of a non-salt forming radical polymerization initiator and a salt or partial salt of an acid-containing polymer containing one or more pendent double bonds. The presence of the pendent double bonds in the polymer salt provides a convenient grafting site for the polymer being formed by the free radical polymerization.

The resultant polymer emulsion or dispersion formed by the process has excellent stability and compatibility. In addition, polymers formed by the process have excellent properties and can be utilized as resin vehicles in various coating applications. Moreover, resin vehicles utilizing these polymers can be applied to various substrates not only by conventional means such as brushing, dipping, spraying, or the like, but also by electrodeposition.

DETAILED DESCRIPTION OF THE INVENTION

The uniqueness of the process of this invention is its versatility in the synthesis of water-reducible dispersion polymers which are especially useful for coatings application. The process herein and its polymerization kinetics have some similarities to the conventional emulsion or suspension polymerization processes, in which as is well known, the monomers are polymerized in the presence of water-soluble dispersion stabilizers and polymerization initiators. This method, like conventional processes, is characterized by the high rate of polymerization and the production of very high molecular weight polymers in the form of dispersions or emulsions. While as indicated, the present process has some similarities to those conventional processes, there are a number of very significant differences.

The dispersion stabilizers employed in the conventional processes are ordinarily low molecular weight water-soluble oligomers. As is well known to those in the coatings art, the presence of such water-soluble oligomers in a film formed from the polymer is a cause of concern because they can contribute to problems of water sensitivity, durability, exudation and compatibility. Moreover, these conventional dispersion stabilizers are ordinarily present in the form of salts of fixed bases such as sodium hydroxide, potassium hydroxide and the like and the presence of these salts can also lead to humidity, gloss and compatibility problems. In contrast, the dispersion stabilizers of this invention are tailormade, water-reducible, high molecular weight polymers. These tailor-made polymers are formed from water-insoluble acid-containing polymer which are preferably solubilized or partially solubilized with a volatile organic base or ammonia, which during formation of the film, escapes from the film thereby producing a film which is relatively insensitive to humidity and water.

Another significant difference in the presence process is the type of polymerization initiator which is employed. Conventional polymerization initiators employed in most emulsion or dispersion polymerization processes are salts of peroxy disulfates. The use of such compounds in the polymerization process usually results in the formation of water-soluble by-products during the polymerization process, thereby also leading to films having possible humidity and water sensitivity problems. In contrast, in the practice of the process of this invention in which the dispersion stabilizer is preferably an amine salt of an acid containing polymer, it is preferred to use an organic initiator such as the azo compounds or an organic peroxide. These initiators unlike the ionic salts which can lead to destabilization of the polymer salt do not produce water-soluble salts which might affect the water sensitivity of the film.

Moreover, the dispersion stabilizer backbone herein is designed to contain some pendent double bonds for grafting during dispersion polymerization. This results in much greater compatibility between the dispersion stabilizer and the dispersed polymer phase, and more stability in the final polymer dispersion. The process of this invention provides for the preparation of emulsion polymers in which the disadvantages of emulsion polymers prepared by prior conventional processes have been substantially eliminated. Thus, the present process provides for the preparation of emulsion polymers which are free of water-soluble, low molecular weight dispersion stabilizers, and fixed metallic salt groups derived from the dispersion stabilizers, initiators and buffers employed in the conventional processes.

The invention provides a novel method for preparing aqueous polymer dispersions which are free from oligomeric surfactants and water-soluble inorganic salts formed as reaction by-products of the polymerization initiator. This freedom improves or eliminates the obvious problems of water and humidity sensitivity in conventional coatings application and this freedom eliminates the problems of high conductivity and low throw power in electrodeposition.

Moreover, by grafting the polyelectrolyte with the dispersed polymer, the problems of compatibility between different polymeric species are eliminated, resulting in the capability of alloying various polymeric species, possible without the obvious question of compatibility, gloss, migration and exudation. Prior to this invention, the possibility of alloying diverse polymer species was considered to be an extremely difficult, if not impossible task. This invention permits the alloying of diverse polymer species with the same facility as encountered in the alloying of metals in the metal industry.

Those active in the dispersion or emulsion polymerization arts have heretofore expended considerable effort in an attempt to eliminate or to reduce as much as possible the use of dispersion or emulsifying agents in order to eliminate the adverse effects of these agents on compatability, gloss, water sensitivity, humidity, blushing, exudation, migration, embrittlement, etc.

In this invention, the use of a high concentration of the polyelectrolyte is not so limited because the polyelectrolytes employed herein (i.e., the polymer salt) are not as water-sensitive, particularly when the bases employed in forming the polymer salt are volatile, and also because the polyelectrolytes herein are polymeric in nature rather than oligomeric they do not lead to problems of migration, exudation, etc. To the contrary, in the practice of this invention, the use of a high concentration of polyelectrolyte is desirable and recommended and provides a means of preparing a new generation of polymer alloys with differing dispersed polymer phases. This non-limiting parameter provides a means of achieving novel polymer alloys utilizing a very convenient and uncomplicated polymerization procedure.

With certain specified limitations, the method of this invention is applicable to the preparation of a variety of polymers in aqueous medium. The basic limitation in this regard is that the polymer to be prepared is formed from monomers which are polymerizable by means of free radical addition polymerization. A further limitation of somewhat less significance is that ordinarily monomers containing acid functionality should not be employed in preparing the polymer. The reason for this is that the presence of significant amounts of acid functionality in the polymer may affect the stability of the resultant polymer emulsion or dispersion. However, in certain instances, minor amounts of such monomers may be employed.

Subject to the above limitations, various polymers can be prepared in aqueous medium by the method of this invention. For example, acrylic polymers and interpolymers, vinyl polymers and copolymers, diene polymers and the like may be prepared in aqueous medium by the method of this invention.

Acrylic polymers and interpolymers which may be prepared in aqueous medium by the method include thermoplastic acrylic polymers and thermosetting acrylic polymers and interpolymers.

Illustrative of a few of the many thermoplastic acrylic polymers which may be prepared in aqueous medium by the method of the invention are homopolymers and copolymers of alkyl acrylates and methylacrylates such as methyl acrylate, ethyl acrylate, propyl acrylate, butyl acrylate, isobutyl acrylate, decyl acrylate, methyl methacrylate, ethyl methacrylate, propyl methacrylate, butyl methacrylate, isobutyl methacrylate, lauryl methylacrylate, decyl methacrylate, dodecyl methacrylate, and the like; and copolymers of alkyl acrylates and/or methacrylates with other monomers such as styrene, alpha-methyl styrene, acrylonitrile, methacrylonitrile, and the like.

Illustrative of a few of the many thermosetting acrylic polymers which may be prepared in aqueous medium by the method of this invention are the well known interpolymers formed from hydroxyalkyl esters of ethylenically unsaturated acids and other polymerizable ethylenically unsaturated monomers such as are described in detail in U.S. Pat. No. 3,544,489. Preferred monomer systems used to produce such interpolymers in this invention are those hydroxyalkyl esters in which the alkyl group has up to about 12 carbon atoms. Especially preferred esters are acrylic acid and methacrylic acid esters of glycol and 1,2-propylene glycol, i.e., hydroxyethyl acrylate and methacrylate, and hydroxypropyl acrylate and methacrylate. Combinations of these esters are also widely used. However, there may also be employed similar esters of other unsaturated acids, for example, ethacrylic acid, crotonic acid, and similar acids having up to about 6 carbon atoms, as well as esters containing other hydroxyalkyl radicals, such as hydroxybutyl esters and hydroxylauryl esters.

In addition to esters of unsaturated monocarboxylic acids, there may be employed the mono- or diesters of unsaturated dicarboxylic acids, such as maleic acid, fumaric acid and itaconic acid, in which at least one of the esterifying group is hydroxyalkyl. Such esters include bis(hydroxyethyl)maleate, bis(hydroxypropyl)fumarate, and similar bis(hydoxyalkyl)esters, as well as mixed alkyl hydroxyalkyl esters, such as butyl hydroxyethyl maleate and benzyl hydroxypropyl maleate. Monoesters such as mono(hydroxyethyl) and mono(hydroxypropyl)esters of maleic acid and similar acids can also be used.

The monomer or monomers with which the hydroxyalkyl ester is interpolymerized can be any ethylenic compound copolymerizable with the ester, the polymerization taking place through the ethylenically unsaturated linkages. These include monoolefinic and diolefinic hydrocarbons, halogenated monoolefinic and diolefinic hydrocarbons, unsaturated esters of organic and inorganic acids, esters of unsaturated acids, nitriles, and the like. Examples of such monomers include styrene, 1,3-butadiene, 2-chlorobutene, alpha-methylstyrene, alpha-chlorostyrene, 2-chloro-1,3-butadiene, 1,1-dichloroethylene, vinyl butyrate, vinyl acetate, alkyl chloride, dimethyl maleate, divinylbenzene, diallyl itaconate, triallyl cyanurate, and the like.

The most useful interpolymers of this type are produced by the interpolymerization of one or more hydroxyalkyl esters with one or more alkyl esters of ethylenically unsaturated carboxylic acids or a vinyl aromatic hydrocarbon, or both. Among these preferred comonomers are the ethyl, methyl, propyl, butyl, hexyl, ethyl hexyl, and lauryl acrylates and methacrylates, as well as similar esters having up to 20 carbon atoms in the alkyl group. Among the vinyl aromatic hydrocarbons generally utilized are styrene and alpha-alkylstyrene or vinyl toluene. The preferred monomer systems may also include an ethylenically unsaturated nitrile, such as acrylonitrile or methacrylonitrile. The specific comonomers most often employed are methyl methacrylate, ethyl acrylate, styrene, vinyltoluene, acrylonitrile, methacrylontrile, 2-ethylhexyl acrylate, butyl acrylate, butyl methacrylate, and lauryl methacrylate.

Another group of thermosetting acrylic polymers which may be prepared in aqueous medium by the method of this invention are the amide containing interpolymers of the type described in U.S. Pat. Nos. 3,037,963 and 3,118,853. These interpolymers may be formed by the method of the instant invention by addition polymerization of an unsaturated carboxylic acid amide such as acrylamide or methacrylamide and the like or an N-alkoxyalkyl-substituted amide such as N-(butoxymethyl)acrylamide, N-(butoxymethyl)methacrylamide and the like with at least one other polymerizable monomer containing a $CH_2=C<$ group. Examples of such other monomers include styrene, isobutylene, vinyl chloride, vinylidene chloride, vinyl acetate, and the alkyl-acrylates and methacrylates described above.

As indicated, vinyl polymers and copolymers may also be prepared in an aqueous medium by the method of this invention. Thus, vinyl polymers such as homopolymers and copolymers of vinyl acetate, vinyl alcohol, vinyl chloride and vinyl butyral may be prepared by this method.

In addition, diene polymers and copolymers can be prepared in aqueous medium by the method of this invention.

Various dienes which may be used in preparing the polymer by the method of the invention include in addition to 1,3-butadiene, which is preferred, isoprene and most of the di-unsaturated members of the alkylidene series including the substituted and unsubstituted conjugated diolefins. The substituted diolefins may be those containing lower alkyl groups or halogen directly bonded to the alkylidene chain. Representative examples of these diolefins include chloroprene, 2,2-dimethylbutadiene, myrcene and the like. Also, mixtures of dienes can be used.

Certain advantages can be obtained by combining the diene with ethylenically unsaturated comonomers (other than the dienes mentioned above). Examples of ethylenically unsaturated comonomers are vinyl monomers which are characterized as having the $CH_2=C<$ group, and can be present in amounts of up to 65 and preferably 20 to 40 percent by weight based on total weight of reactive monomer components. Examples of the vinyl monomers which may be used are: monoolefinic and diolefinic hydrocarbons such as styrene, vinyl toluene, cyclopentadiene and the like; halogenated monoolefinic and diolefinic hydrocarbons such as alpha-chlorostyrene; esters of organic and inorganic acids such as vinyl acetate, methyl methacrylate, butyl methacrylate, ethyl acrylate, butyl acrylate, isopropenyl acetate, allyl chloride, allyl cyanide, dibutyl itaconate, ethyl alpha-chloroacrylate, and diethyl maleate; organic nitriles such as acrylonitrile, methacrylonitrile and ethacrylonitrile.

As indicated above in accordance with the method of the invention the polymerization of the monomers is carried out in the presence of the salt or partial salt of an acid-containing polymer having one or more pendent double bonds and a non-salt forming free radical polymerization catalyst.

Acid-containing polymers which can be employed may be virtually any acid-containing polymers which can be neutralized or partially neutralized with an appropriate basic compound to form a salt or partial polymer salt which can be dissolved or stably dispersed in the aqueous medium.

Acid-containing polymers which may be employed include among many others acid containing acrylic polymers and interpolymers, polyester polymers and alkyd resins. Acid containing acrylic polymers are well known in the art and are prepared by polymerizing an unsaturated acid, preferably an alpha, beta-ethylenically unsaturated carboxylic acid with at least one other polymerizable monomer containing a $CH_2=C<$ group. These acid containing acrylic polymers may be any of the acrylic polymers described heretofore which further include an unsaturated carboxylic acid. Thus, suitable acid containing acrylic polymers may be prepared by polymerizing, for example an alkyl acrylate or methacrylate with acrylic aciid or methacrylic acid and another ethylenically unsaturated monomer such as styrene, alpha methylstyrene, acrylonitrile, methacrylonitrile and the like. In addition acid containing acrylic interpolymers of an unsaturated carboxylic acid amide or an N-alkoxyalkyl-substituted amide, an alpha, beta ethylenically unsaturated carboxylic acid and other ethylenically unsaturated monomers such as styrene, acrylonitrile, methacrylonitrile, or the like may be utilized. The acid containing polymer can also be a conventional alkyd resin prepared by reacting an oil or oil fatty acid with an unsaturated polycarboxylic acid or acid anhydride. Oils which may be employed in the alkyd are preferably drying oils which are esters of fatty acids which can be obtained from naturally occurring sources or by reacting a fatty acid with a polyol. Drying oils all contain at least a portion of polyunsaturated fatty acids. Drying oils are those oiils which have an iodine value of about 90 or above as determined by ASTM-D-1467 and thus include the so-called semi-drying oils. Examples of suitable naturally occurring drying oils are linseed oil, soya oil, safflower oil, parella oil, tung oil, oiticia oil, poppyseed oil, sun flower oil, tall oil esters, walnut oil, dehydrated caster oil, herring oil, manhatan oil, sardine oil and the like. The drying oils may also be obtained by reacting fatty acids with a polyol. Suitable fatty acids are oleic, linoleic and linolenic. Various polyols can be used including butanediol, glycerol, trimethylolethane, trimethylolpropane, triethanolpropane, trimethanhexane, pentaerythritol and sorbitol. The drying oils can be modified with other acids including saturated, unsaturated or aromatic acids such as butyric acid, stearic acid, maleic acid, phthalic acid, isophthalic acid, terephthalic acid, rosin or benzoic acid or an anhydride of such an acid. These acid modified oils are made by transesterification of the ester as by forming a di- or monoglyceride by alcoholysis followed by esterification with a modifying acid. The polycarboxylic acid utilized in forming the alkyd can be an alpha, beta-ethylenically unsaturated dicarboxylic acid or its anhydride such as maleic acid, fumaric acid, itaconic acid, maleic anhydride and itaconic anhydride. Mixtures of the same or different acids and anhydrides may also be utilized. Ordinarily, the acid and anhydride employed should contain from about 4 to about 10 carbon atoms, although longer chain compounds can be employed if desired.

In addition to acid-containing acrylic polymers and alkyd resins, conventional polyester resins formed by reacting a polyol and a polycarboxylic acid may be employed. Various polyols can be employed including glycerol, pentaerythritol, dipentaerythritol, manitol, sorbitol, trimethylolethane, trimethylolpropane, 1,3,6-hexanetriol and the like. Various polycarboxylic acids may be employed including dicarboxylic acids such as phthalic acid, isophthalic acd, terephthalic acid, tetrachlorophthalic acid, tetrabromophthalic acid, chlorendic acid, fumaric acid, maleic acid, itaconic acid, adipic acid, sebacic acid, and the like.

The proportion of acid constituent employed in the acid-containing polymer may vary somewhat depending upon the specific polymer employed, the degree of neutralization desired, and the like. In general, an acid-containing acrylic polymer may contain from about 5 percent to about 25 percent by weight of polymer solids of the acid constituent with a preferred amount being from 5 percent to 15percent by weight.

In the case of alkyd and polyester polymers a sufficient excess of the acid component is employed in forming the polymers to provide for neutralization and solubilization characteristics. In general, the acid value of the alkyd or polyester may range from 10 to 120 with a preferred acid value being from 30 to 60.

As referred to above, the acid-containing polymer employed in the practice of the method of this invention further contains one or more pendent double bonds. The term "pendent" as used in this regard means that there is attached to the polymer chain one or more groups or compounds containing double bonds. The attachment of a double bond containing material to the polymer chain can be accomplished by any convenient method. Thus, for example, virtually any ethylenically unsaturated compound having a reactive functional group can be reacted with a portion of the acid groups of the acid-containing polymer or with any other co-reactive functional group included in the polymer chain. Thus, the double bond containing compound can be reacted with carboxyl or anhydride groups or hydroxy groups and the like. However, in the practice of this invention, the preferred method is to react a functional group-containing ethylenically unsaturated compound with a portion of the acid groups of the polymer. Virtually any compound containing ethylenic unsaturation and a functional group capable of reacting with the acid groups of the polymer can be employed for that purpose. Examples of suitable compounds which are preferred include: epoxy esters of ethylenically unsaturated acids such as glycidyl acrylate and methacrylate and the like and hydroxy alkyl esters of ethylenically unsaturated acids such as hydroxyethyl acrylate, hydroxymethyl methacrylate, hydroxypropyl acylate, hydroxypropyl methacrylate, and the like. Many other suitable compounds will be suggested to those skilled in the art.

The amount of these functional group containing ethlenically unsaturated compounds which may be reacted with the acid groups of the polymer to attach pendent double bonds thereto may vary considerably. It will of course, be understood that the amounts of these compounds utilized must not be so great as will lead to premature gellation of the polymer. In general, from about 0.1 to about 10 percent by weight of these compounds, preferably from 0.5 to about 5.0 percent, based upon polymer solids can be employed.

As indicated, the pendent double bonds of the acid-containing polymer are preferably obtained by reacting the functional group containing ethylenically unsaturated compound with the acid groups of the acid-containing polymer. This can be accomplished by simply heating the acid-containing polymer solution in the presence of the functional group containing ethylenically unsaturated compound. However, it is preferred to include in this reaction procedure a suitable polymerization inhibitor. Suitable polymerization inhibitors which may be employed for this purpose include conventional polymerization inhibitors such as hydroquinone, para-methoxyphenol, and the like.

As indicated heretofore, the salt or partial salt of the acid-containing polymer is formed by neutralizing or partly neutralizing the acid groups of the polymer with an appropriate basic compound. Suitable basic compounds which may be utilized for this purpose include inorganic bases such as alkali metal hydroxides, for example, sodium or potassium hydroxide or organic bases such as ammonia or a water-soluble amine or a quaternary ammonium hydroxide. Among the amines which may be utilized are water soluble, primary, secondary and tertiary amines such as methylamine, ethylamine, propylamine, dimethylamine, diethylamine, dipropylamine, trimethylamine, triethylamine, tripropylamine, monoethanolamine, monobutanolamine, diethanolamine, dibutanolamine, triethanolamine, tributanolamine, and the like. Examples of the quaternary ammonium hydroxides which may be employed include trimethyl benzyl ammonium hydroxide and trimethyl lauryl ammonium hydroxide.

The degree of neutralization required, to form the desired polymer salt may vary considerably depending upon the amount of acid included in the polymer, and the degree of solubility or dispersibility of the salt which is desired. Ordinarily in making the polymer water-dispersible, the acidity of the polymer may preferably be about 25 percent neutralized with the water-soluble basic compound.

The salt of the acid-containing polymer can be prepared utilizing any of the known methods heretofore employed in making water-reducible or dispersible polymers. A preferred method of making a salt of an acid containing acrylic polymer for use in the practice of this invention is to polymerize the acrylic monomers including the acid monomer in a water miscible organic solvent or mixture of solvents to first form the polymer in solution. Then, the acid groups of the polymers are appropriately neutralized with a water-soluble or miscible basic compound, preferably in aqueous medium. The resultant polymer salt is then readily soluble or dispersible in aqueous medium.

As mentioned previously, the polymers prepared in accordance with this invention are prepared in the presence of the above-described polymer salts and a non-salt forming polymerization initiator. The term "non-salt forming" as applied to the initiators throughout this specification and in the claims refers to initiators which do not form inorganic salt by-products during or subsequent to the polymerization process. The preferred non-salt forming initiators are organic initiators which are commonly referred to the polymerization art as oil-soluble initiators (e.g., see the publication, High Polymers, Volume IX, entitled Emulsion Polymerization, Authored by Bovey, Kolthoff, Medalia and Meehan, published by Interscience Publishers Inc., Third Printing, May, 1965). Examples of suitable non-salt forming initiators of this type include azobisisobutyronitrile, cumene hydroperoxide, diisopropylbenzene, hydroperoxide, diazothioether, para-methoxyphenyl diazothio-(2-naphthyl) ether and parachlorobenzyl peroxide. Cumene hydroperoxide and azobisisobutyronitrile are the preferred free radical initiators. These initiators bring about approximately 100 percent conversion of monomer into polymer product.

Besides the free radical initiator, a chain transferring agent such as tertiary-dodecyl mercaptan, 2-mercaptoethanol, isooctyl mercaptopropionate para-octylmercaptan or 3-mercaptopropionic acid is preferably incorporated into the polymer charge. The chain transferring agents provide the necessary control over the molecular weight to give products having the required viscosity for various coating applications. Tertiary-dodecyl mercaptan is preferred because it results in high conversion of monomer to polymer product.

The following examples are submitted for the purpose of further illustrating the nature of the present invention and should not be construed as a limitation upon the scope thereof. Unless otherwise indicated, all parts and percentages in the examples are by weight.

EXAMPLE I

This example illustrates the preparation of a salt of an acid-containing polymer having pendent double bonds attached to the polymer chain.

Into a reactor equipped with a stirrer, thermometer, nitrogen inlet, dropping funnel and a condenser equipped with a water trap was charged 210.0 grams of ethylene glycol monoethylether and 300.0 grams of a feed mixture (designated feed mixture A for convenience) containing 14.9 percent of acrylic acid, 40.6 percent of styrene, 41.1 percent ethyl acrylate, 1.0 percent azobisisobutyronitrile and 2.4 percent 2-mercaptoethanol. The mixture was heated to 120° C. over period of 1 hour and 20 minutes. Then, 784.0 grams of additional feed mixture A were added to the reaction mixture over a period of about 3 hours. After this addition was completed, 4.5 grams of a mixture containing 66.7 percent of ethylene glycol monoethylether and 33.3 percent of tertiary-butylperbenzoate were added to the reactor and the reaction mixture held for one hour. After this addition was completed, an additional 4.5 grams of this ethylene glycol monoethyl ether-tertiary butyl perbenzoate mixture was added to the reactor and held for an additional hour. Following this addition, an additional 4.5 grams of this mixture was added to the reactor and the mixture held for 2 hours. The mixture was then cooled. Subsequently, the reactor mixture was again heated to a temperature of 130° C. over a period of 1 hour and 15 minutes. At this time 80 grams of glycidyl methacrylate and 3 grams of hydroquinone were added to the reaction mixture and heating continued for approximately 5 hours and 15 minutes. The mixture was then cooled and a mixture consisting of 500 grams of deionized water at a temperature of 75° C. and 96 grams of dimethyl ethanolamine were added to the reactor. Following completion of this addition, an additional 1500 grams of deionized water at 75° C. was added to the reaction mixture.

The resultant polymer salt dispersion had a total solids content at 150° C. of 32.4 percent by weight.

EXAMPLE II

This example illustrates the preparation of an amide-containing acrylic polymer in the presence of the polymer salt dispersion of Example I and azobisisobutyronitrile catalyst as the non-salt forming free radical polymerization catalyst.

Into a reactor equipped as in Example I was charged 372.2 grams of the polymer salt dispersion of Example I and 152.7 grams of deionized water. The mixture was heated under nitrogen and then 209.1 grams of a feed mixture containing 26.3 percent styrene, 26.7 percent ethyl acrylate, 46.2 percent of a 61.5 percent solids solution of N-(butoxymethyl)acrylamide in a solvent mixture consisting of 25 percent toluene and 75 percent butanol and 0.8 percent of azobisisobutyronitrile was added to the reaction mixture. The mixture was heated to 90° C. and held for 3 hours. At this time, 0.42 grams of azobisisbutyronitrile were added to the reaction mixture and the mixture held for one hour. Following this addition, an additional 0.42 grams of azobisisobutyronitrile was added to the reaction mixture and held for 2 hours. The mixture was then cooled.

The resultant polymer dispersion product had the following properties:

| | | |
|---|---|---|
| Total solids content at 150° C. | 39.7 | percent |
| pH | 7.7 | |
| Viscosity | 830 | centipoises |

A sample of the resultant polymer dispersion was drawn down on a metal substrate and formed a smooth, continuous film having an excellent appearance.

EXAMPLE III

This example illustrates the preparation of a polystyrene polymer prepared in the presence of a salt of a maleinized oil adduct having pendently attached to the adduct backbone a double bond containing material.

Into a reactor equipped as in Example I was charged 200.0 grams of maleinized oil adduct formed by reaction of 20 parts of maleic anhydride and 80 parts of linseed oil in accordance with the procedure described in Example IV of U.S. Pat. No. 3,258,437, 0.25 parts of hydroquinone and 14.0 grams of hydroxyethyl methacrylate. The mixture was heated to 85° C. over a period of 10 minutes and then 24.0 grams of diethylamine and 450 grams of deionized water were added to the reactor. Immediately following this addition, 100 grams of styrene, 1.5 grams of azobisisobutyronitrile and 1.0 grams of tertiary dodecylmercaptan were added to the reactor. The mixture was heated to reflux over a period of about 25 minutes. Then 0.5 grams of azobisisobutyronitrile were added to the mixture. Thirty minutes later, an additional 0.5 grams of azobisisobutyronitrile were added. About 1½ hours after this addition, an additional 0.5 grams of azobisisobutyronitrile were added. Heating was continued for an additional hour and then 5 grams of triethanolamine were added to the reactor. The resultant polymer dispersion had the following properties:

| | | |
|---|---|---|
| Total solids content at 150° C. | 37.5 | percent by weight |
| pH | 6.5 | |
| Film | Clear | |

EXAMPLE IV

To a reactor equipped as in Example I was charged 400.0 grams of the maleinized oil adduct of Example III, 20.0 grams of hydroxyethyl acrylate, and 0.6 grams of p-methoxyphenol. The charged mixture was heated under nitrogen to 80° C. and then held for one hour. Then, 66.0 grams of triethylamine were added to the reaction mixture. After this addition was completed, 900.0 grams of deionized water, at a temperature of 75° C. were added to the reaction mixture over a period of about 20 minutes. At this time, 408.0 grams of a feed mixture containing 58.8 percent butylacrylate, 39.2 percent acrylonitrile, 1.0 percent tertiary dodecyl mercaptan and 1.0 percent azobisisobutyronitrile was added to the reaction mixture over a period of 1.5 hours. The reaction mixture was then held for one hour. Following this, 1.0 grams of azobisisobutyronitrile were added to the reaction mixture and held for one hour. After this addition, 2.0 grams of azobisisobutyronitrile were added to the reaction mixture in 1.0 gram increments per hour over a 2 hour period. The mixture was then cooled.

The resultant acrylic polymer dispersion perduct had the followng properties:

| | |
|---|---|
| Total solids content at 150° C. | 43.8 percent by weight |
| pH | 7.5 |
| Surface tension (dynes/centimeter) | 41.1 ± 0.35 |

EXAMPLE V

To a reactor was charged 3600.0 grams of maleinized oil adduct of Example III, 180.0 grams of hydroxyethyl acrylate and 2.7 grams of paramethoxyphenol. The mixture was heated under nitrogen to 80° C. and held for six hours, then cooled. To a reactor equipped as in Example I was charged 400.0 grams of this product. The reaction mixture was heated to 60° C., then 66.0 grams of triethylamine was added to the reaction mixture. Following this addition, 1600.0 grams of deionized water were added to the reaction mixture. After this addition was complete, 1299.0 grams of a feed mixture containing 46.2 percent butyl acrylate, 37.0 percent styrene, 15.0 percent of a 61.5 percent solids solution of N-(butoxymethyl)acrylamide in a solvent mixture containing 1 part xylene to 3 parts of butanol, 0.9 percent tertiary dodecylmercaptan and 0.9 percent azobisisobutyronitrile were added to the reaction mixture over a period of about 2 hours. Following this, 6.0 grams of azobisisobutyronitrile was added to the reaction mixture over a period of 3 hours in increments of 2.0 grams each hour. The mixture was then cooled.

The resultant amide-containing polymer dispersion product had the following properties:

| | | |
|---|---|---|
| 150° C. solids content | 44.5 | percent |
| pH | 7.7 | |
| Viscosity | 65 | centipoises |

EXAMPLE VI

In a reactor equipped as in Example I was charged 700.0 grams of ethylene glycol monoethylether. The contents of the reactor were heated to 130° C. and 3570 grams of a feed mixture containing 61.8 percent ethyl acrylate, 30.3 percent methyl methacrylate, 5.9 percent methacrylic acid, 1.0 percent azobisisobutyronitrile and 1.0 percent tertiary dodecylmercaptan was added to the reactor over a period of three hours. The reaction mixture was then held for one hour. Following this, 175.0 grams of ethylene glycol monoethylether and 17.5 grams of tertiary butyl perbenzoate were added to the reaction mixture. The reaction mixture was then held for 2 hours. At this time, 5.6 grams of para-methoxyphenol and 87.5 grams of glycidyl methacrylate were added to the reaction mixture and the mixture held for four hours. Then, 252.0 grams of triethylamine were added to the reaction mixture. Following this addition, 6,020.0 grams of deionized water at a temperature of 75° C. were added to the reaction mixture. The reaction mixture was then cooled.

The resultant polymeric salt product had a total solids content at 150° C. of 30 percent, a pH of 8.9, a viscosity of 12,400 centipoises and an acid value of 11.8.

EXAMPLE VII

To a reactor equipped as in Example I was charged 1875.0 grams of the polymeric salt product of Example VI and 67.5 grams of deionized water. The reaction mixture was heated under nitrogen to 85° C. and 567.9 grams of a feed mixture containing 32.5 percent methyl methacrylate, 66.5 percent ethyl acrylate and 1 percent azobisisobutyronitrile was added to the reaction mixture. Heating was then continued for about 15 minutes at which time an exotherm was noted. Thereafter, heating was continued for an additional 50 minutes. Following this 1.0 grams of azobisisobutyronitrile were added to the reaction mixture. After 1 hour, an additional 1.0 grams of azobisisobutyronitrile were added to the reaction mixture and heating continued for an additional 30 minutes. The reaction mixture was then cooled and filtered.

The resultant polymeric product had the following properties:

| | | |
|---|---|---|
| Total solids content at 150° C. | 44.2 | percent by weight |
| pH | 9.0 | |
| Viscosity | 85 | centipoises |

EXAMPLE VIII

To a reactor equipped as in Example I was charged 500.0 grams of ethylene glycol monoethylether. The contents of the reactor were heated to 132° C. over a period of about 15 minutes. Then, 1428.0 grams of a feed mixture containing 90.2 percent methyl methacrylate, 7.8 percent methacrylic acd, 1.0 percent azobisisobutyronitrile and 1.0 percent tertiary dodecylmercaptan were added to the reaction mixture over a period of 3 hours. The reaction mixture was then held for an additional hour. Following this 25.0 grams of ethylene glycol monoethylether and 6.2 grams of tertiary butyl perbenzoate were added to the reaction mixture and the reaction mixture held for 1.5 hours. Then, 3.0 grams of hydroquinone were added to the reaction mixture. Following this addition, 46.2 grams of glycidyl methacrylate were added. Heating was continued for an additional 8 hours and the reaction mixture was then cooled to 117° C. At this time, 58.3 grams of dimethyl ethanolamine were added to the reaction mixture and then 2400 grams of deionized water at a temperature of 75° C. were added to the reaction mixture to achieve the desired viscosity.

The resultant polymer salt dispersion product had the following properties:

| Total solids content at 150° C. | 34.0 | percent by weight |
|---|---|---|
| Acid value | 13.0 | |

EXAMPLE IX

Into a reactor equipped as in Example I was charged 608.0 grams of the polymer salt dispersion of Example VIII and 192.0 grams of deionized water. The contents of the reactor were then heated to 60° C. and a feed mixture consisting of 160.0 grams of methyl methacrylate, 40.0 grams of butyl acrylate, and 1.0grams of azobisisobutyronitrile were added to the reaction mixture, along with an additional 50 grams of deionized water. At 97° C. refluxing began followed by an exotherm and shortly thereafter refluxing stopped. Heating was continued for an additional hour and 20 minutes and then 0.5 grams of azobisisobutyronitrile were added to the reaction mixture. Then, 1.0 gram of azobisisobutyronitrile was added to the reaction mixture over a period of 2 hours in increments of 0.5 grams after each hour. Twenty minutes after the last addition of azobisisobutyronitrile, heating was discontinued and the reaction mixture was cooled The resultant polymer dispersion product had the following properties:

| Total solids content at 150° C. | 39.2 | percent |
|---|---|---|
| pH | 7.8 | |
| Viscosity | 35 | centipoises |

EXAMPLE X

This example illustrates the preparation of a thermoplastic acrylic polymer in aqueous medium featuring the use of a continuous addition process.

In this example, two premixes were prepared, hereinafter designated as premixes A and B for convenience. The first premix (premix A) contained 608.0 grams of the polymeric salt dispersion of Example VIII and 400.0 grams of deionized water. The second premix (premix B) was prepared and contained 520.0 grams of methylmethacrylate, 80.0 grams of butylacrylate, 3.0 grams of azobisisobutyronitrile and 3.0 grams of tertiary dodecylmercaptan. Both premixes were then admixed together, utilizing conventional mixing equipment.

320 grams of these combined premixes and 200.0 grams of deionized water were then charged to a reactor equipped as in Example I. The charged mixture was then heated to 75° C. at which point a slight reflux was noted. Heating was discontinued at this point and the reflux ceased in 5 minutes. Then the remaining portion of the combined premix was added to the reaction mixture over a period of 1 hour and 20 minutes with the nitrogen blanket. After an additional heating period of 1 hour and 15 minutes, 0.5 grams of azobisisobutyronitrile were added to the reaction mixture. Then, 1.0 grams of azobisisobutyronitrile was added to the reaction mixture in 0.5 gram increments with each increment being added after an additional 1 hour. After this addition was completed, heating was discontinued and the reaction mixture cooled.

The resultant polymeric product had the following properties:

| 150° C. solids content | 43.4 | percent |
|---|---|---|
| pH | 7.6 | |
| Viscosity | 1130 | centipoises |
| Acid value | 4.3 | |

I claim:

1. A method of producing a polymer in an aqueous medium which comprises addition polymerizing the monomer or monomers from which the polymer is formed in the absence of buffers and polymerization initiators which form water-soluble inorganic salts and in the presence of a non-salt forming free radical organic polymerization initiator or a salt or partial salt of an acid-containing polymer containing one or more pendent double bonds.

2. The method of claim 1 where said polymer is a polymer of acrylic monomers.

3. The method of claim 2 wherein said acrylic momomers are alkyl acrylates, alkyl methacrylates, unsaturated carboxylic acid amides, N-alkoxyalkyl-substituted amides or mixtures thereof.

4. The method of claim 1 wherein said polymer is a polymer of styrene.

5. The method of claim 1 wherein said polymer is a polymer of diene.

6. The method of claim 5 wherein said diene is 1,3-butadiene.

7. The method of claim 1 wherein said free radical polymerization initiator is azobisisobutyronitrile or cumene hydroperoxide.

8. The method of claim 1 wherein the polymerization is carried out in the presence of a chain transfer agent.

9. The method of claim 1 wherein the chain transfer agent is tertiary-dodecyl mercaptan.

10. The method of claim 1 wherein said salt or partial salt of said acid containing polymer containing one or more pendent double bonds is a salt or partial salt of an acid containing polymer of an alpha, beta-ethylenically unsaturated carboxylic acid and at least one other monomer containing a $CH_2\!\!=\!\!C\!<$ group.

11. The method of claim 10 wherein said other monomer is alkyl acrylates, alkyl methacrylates, unsaturated carboxylic acid amides, N-alkoxyalkyl-substituted amides, styrene, alpha-methyl styrene, acrylonitrile or methacrylonitrile or a mixture thereof.

12. The method of claim 1 wherein said pendent double bonds of said acid containing polymer are attached to the polymer chain by reacting a portion of the acid groups of said polymer with a hydroxy or epoxy containing ester of acrylic or methacrylic acid.

13. The method of claim 12 wherein said epoxy containing ester is glycidyl acrylate or glycidyl methacrylate.

14. The method of claim 12 wherein said hydroxy containing ester is hydroxyethyl acrylate or hydroxyethyl methacrylate.

* * * * *